(12) United States Patent
Cheng

(10) Patent No.: US 7,527,534 B1
(45) Date of Patent: May 5, 2009

(54) CABLE CLAMPING DEVICE

(75) Inventor: Yu-Chih Cheng, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 0 days.

(21) Appl. No.: 12/203,377

(22) Filed: Sep. 3, 2008

(30) Foreign Application Priority Data

Jul. 11, 2008 (TW) .............. 97126235 A

(51) Int. Cl.
*H01R 4/50* (2006.01)

(52) U.S. Cl. ................................... 439/770

(58) Field of Classification Search ........... 439/770, 439/772, 773, 769, 761, 760, 756, 501, 502; 385/135; 174/59
See application file for complete search history.

(56) References Cited

U.S. PATENT DOCUMENTS

| | | | | |
|---|---|---|---|---|
| 3,809,798 A | * | 5/1974 | Simon | 174/59 |
| 4,521,067 A | * | 6/1985 | Dufresne | 439/522 |
| 4,576,430 A | * | 3/1986 | Dufresne | 439/429 |
| 4,592,605 A | * | 6/1986 | Kapler | 439/17 |
| 4,822,304 A | * | 4/1989 | Herron | 439/610 |
| 5,825,960 A | * | 10/1998 | Woodward et al. | 385/135 |
| 6,035,521 A | * | 3/2000 | Schley | 29/753 |
| 7,306,480 B2 | * | 12/2007 | Shi et al. | 439/501 |
| 7,354,303 B2 | * | 4/2008 | Shi et al. | 439/501 |

* cited by examiner

*Primary Examiner*—Chandrika Prasad
(74) *Attorney, Agent, or Firm*—Kirton & McConkie; Evan R. Witt

(57) ABSTRACT

A cable management device includes a case, a cable-clamping plate and a sheltering plate. A cable is clamped by the cable-clamping plate. Upon rotation of the sheltering plate, the cable is wound inside of the case. The cable-management device is cost-effective and easy-to-use.

5 Claims, 2 Drawing Sheets

CABLE CLAMPING DEVICE

FIELD OF THE INVENTION

The present invention relates to a cable management device, and more particularly to a cable management device for storing a cable of a wired electronic appliance by rotation.

BACKGROUND OF THE INVENTION

Wired electronic appliances such as electronic peripheral devices, household appliances and communication products are widely used in our daily lives. Conventionally, these wired electronic appliances have respective cables. Generally, the cables are very lengthy and thus become hindrance from using these wired electronic appliances. For shortening the cables, many cable-management devices have been proposed to wind the cables for storage.

Take a mouse for example. A mouse having a winding reel has been disclosed. The cable of the mouse has a terminal fixed inside the winding reel and the other terminal exposed outside the winding reel. Due to an elastic force generated by a resilient sheet within the winding reel, the cable is forcibly wound inside the winding reel. In addition, a desired length of the cable may be pulled out of the winding reel by pulling the exposed cable.

Although the winding reel can wind the cable for storage, there are still some drawbacks. For example, since a terminal of the cable management device is fixed on the winding reel to wind the cable, such a winding reel is only applicable to this mouse but fails to be used in any other mouse. In addition, since the function of automatically winding the cable is principally implemented by the resilient sheet, the resilient sheet is often suffered from elastic fatigue if the winding reel has been used for a long term. Under this circumstance, the conventional cable management device is ineffective for winding the cable. Furthermore, since the resilient sheet and some additional springs are indispensable to the conventional winding reel, the conventional winding reel is not cost-effective.

Therefore, there is a need of providing a cost-effective cable management device for storing a cable so as to obviate the drawbacks encountered from the prior art.

SUMMARY OF THE INVENTION

It is an object of the present invention to provide an easy-to-use cable management device.

Another object of the present invention provides a cost-effective cable management device.

In accordance with an aspect of the present invention, there is provided a cable-management device. The cable management device includes a case, a circular cable-clamping plate and a circular sheltering plate. The case includes a circular base and a cylindrical sidewall perpendicular to the circular base. A receptacle is defined by the circular base and the cylindrical sidewall. Two notches are formed in the cylindrical sidewall for receiving a cable therein. The circular cable-clamping plate is disposed within the receptacle and comprising two retaining blocks. The two retaining blocks are arranged on a first surface of the circular cable-clamping plate such that an elongate gap is defined between the two retaining blocks for clamping the cable therein. The circular sheltering plate covers the circular cable-clamping plate and includes an external surface and an internal surface. A rotary slice is perpendicular to the external surface. A raised block is disposed on the internal surface. The raised block is partially received in the gap when the circular cable-clamping plate is covered with the circular sheltering plate. The circular cable-clamping plate is rotated relative to the case upon rotation of the rotary slice of the circular sheltering plate.

Preferably, the circular cable-clamping plate is an integral part.

In an embodiment, the circular cable-clamping plate further includes a plurality of rollers, which are disposed on a second surface of the cable-clamping plate.

In an embodiment, a protrusion edge is extended from the periphery of the circular sheltering plate, a ring-shaped groove parallel with the circular base of the case is formed in an internal surface of the cylindrical sidewall, and the protrusion edge is received in the ring-shaped groove.

Preferably, the circular sheltering plate is an integral part.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
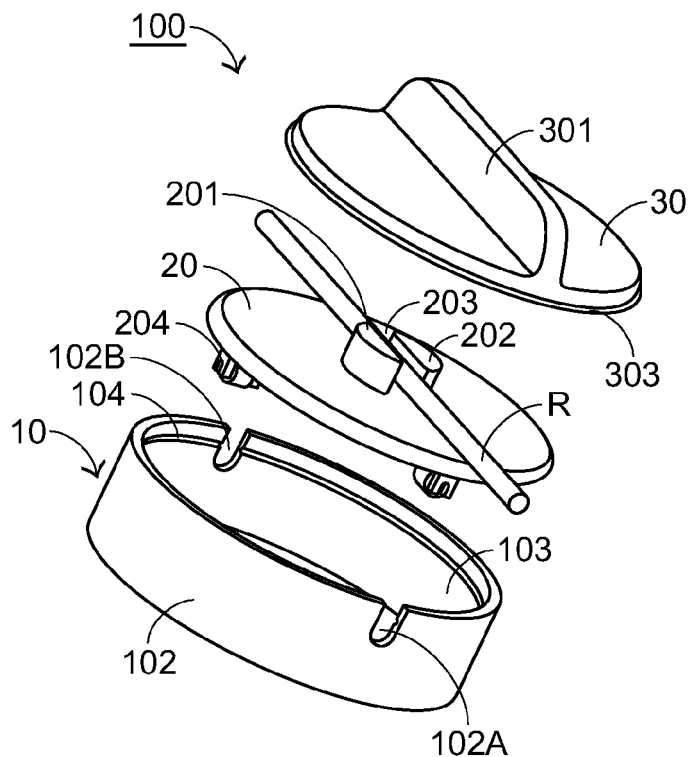
FIG. 1 is a schematic exploded view illustrating a cable management device according to a preferred embodiment of the present invention.
Figure 2:
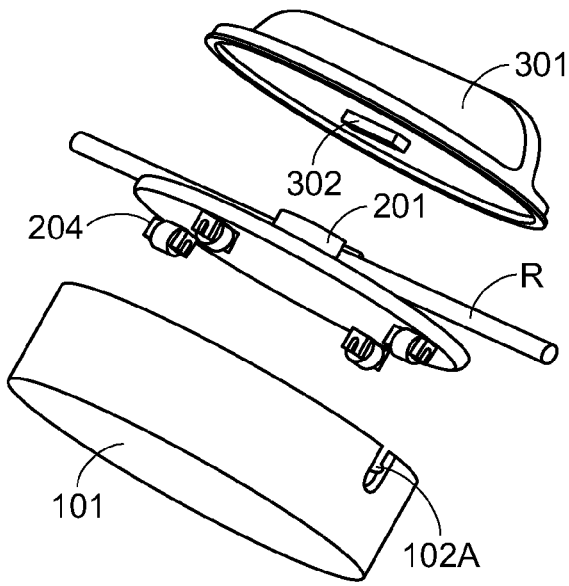
FIG. 2 is a schematic exploded view of the cable management device of FIG. 1 taken from another viewpoint.

FIG. 1 is a schematic exploded view illustrating a cable management device according to a preferred embodiment of the present invention. FIG. 2 is a schematic exploded view of the cable management device of FIG. 1 taken from another viewpoint. As shown in FIGS. 1 and 2, the cable management device 100 principally comprises a case 10, a circular cable-clamping plate 20 and a circular sheltering plate 30.

The case 10 comprises a circular base 101 and a cylindrical sidewall 102. The cylindrical sidewall 102 is perpendicular to the circular base 101. As a consequence, a receptacle 103 is defined by the circular base 101 and the cylindrical sidewall 102. Two notches 102A and 102B are formed in the cylindrical sidewall 102. A cable R may be received in the notches 102A and 102B. Moreover, a ring-shaped groove 104 is formed in the internal surface of the cylindrical sidewall 102.

The circular cable-clamping plate 20 comprises two retaining blocks 201 and 202. These two retaining blocks 201 and 202 are arranged on a surface of the circular cable-clamping plate 20 such that an elongate gap 203 is defined between these two retaining blocks 201 and 202 for clamping the cable R therein. It is preferred that the circular cable-clamping plate 20 further comprises several (e.g. 4) rollers 204.

The circular sheltering plate 30 comprises a rotary slice 301 and a raised block 302. The rotary slice 301 is perpendicular to the external surface of the circular sheltering plate 30. The raised block 302 is disposed on the internal surface of the circular sheltering plate 30. In addition, a protrusion edge 303 is extended from the periphery of the circular sheltering plate 30.

Figure 4:
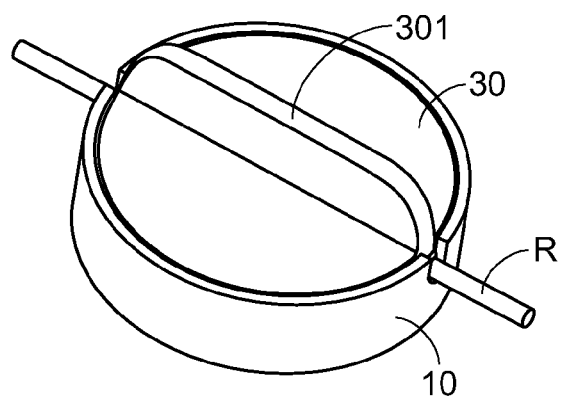
FIG. 4 is a schematic assembled view of the cable-management device of the present invention.
Figure 5:
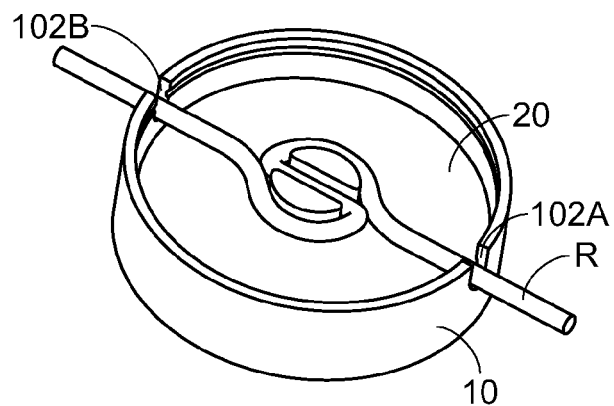
FIG. 5 schematically illustrates that a portion of the cable is wound inside of the cable-management device of the present invention.

Hereinafter, a process of assembling the cable-management device 100 and the operation of the cable management device 100 will be illustrated in more detail with reference to FIGS. 3, 4 and 5.

Figure 3:
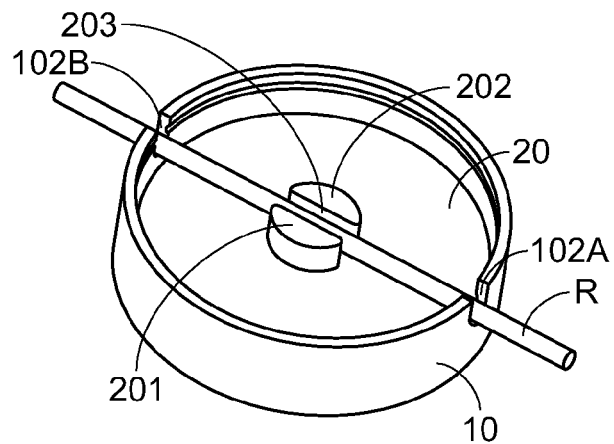
FIG. 3 schematically illustrates that the cable is initially fixed by the cable-management device of the present invention.

First of all, as shown in FIG. 3, the circular cable-clamping plate 20 is received in the receptacle 103 of the case 10 such that the rollers 204 of the circular cable-clamping plate 20 are contacted with the base 101 of the case 10. Next, a segment of the cable R is received in the notches 102A and 102B and the elongate gap 203 defined by the two retaining blocks 201 and 202. Next, the circular sheltering plate 30 is placed on the cable-clamping plate 20 such that the raised block 302 of the circular sheltering plate 30 is partially received in the elongate gap 203 so as to suppress the cable R in the elongate gap 203, as can be seen in FIG. 4. Meanwhile, the protrusion edge 303 is embedded into the ring-shaped groove 104 of the case 10. Upon rotation of the rotary slice 301 of the circular sheltering plate 30, the circular cable-clamping plate 20 is rotated relative to the case 10 with the location at the elongate gap 203 serving as the pivot. As a consequence, the cable R outside the case 10 is wound inside of the receptacle 103 of the case 10 through the notches 102A and 102B, as can be seen in FIG. 5. For winding more length of the cable R inside the case 10, the rotary slice 301 of the circular sheltering plate 30 should be rotated for more turns. On the other hand, the circular sheltering plate 30 may be detached from the case 10 in order for pulling the cable R out of the cable-management device 100.

Furthermore, the cooperation between he protrusion edge 303 of the circular sheltering plate 30 and the ring-shaped groove 104 of the case 10 renders smooth rotation of the circular sheltering plate 30 with respect to the case 10. The rollers 204 of the circular cable-clamping plate 20 are employed to reduce the friction force between the circular cable-clamping plate 20 and the base 101 of the case 10 upon rotation, so that a reduced torsion force is required to rotate the circular sheltering plate 30 by the user.

In the above embodiments, the major components of the cable-management device 100 are produced by plastic injection molding. For example, the case 10, the circular cable-clamping plate 20 and the circular sheltering plate 30 are produced by plastic injection molding as integral parts. In addition, the rollers 204 may also be produced by plastic injection molding. In comparison with the conventional winding reel, the cable-management device of the present invention uses cost-effective material and has low fabricating cost. Moreover, the cable-management device of the present invention is not attached to a specified electronic appliance. In other words, the cable-management device of the present invention is portable and applicable to any wired electronic appliance. Depending on the length of the cable, the receptacle of the case may be adjusted as required. For storing a longer cable, the volume of the cable management device may be increased. On the contrary, for storing a short or thin cable, a small-sized cable management device is sufficient. Since the function of storing the cable is implemented by rotating the rotary slice 301 of the circular sheltering plate 30, the cable management device of the present invention is ease-to-use.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cable management device comprising:
    a case comprising a circular base and a cylindrical sidewall perpendicular to said circular base, wherein a receptacle is defined by said circular base and said cylindrical sidewall, and two notches are formed in said cylindrical sidewall for receiving a cable therein;
    a circular cable-clamping plate disposed within said receptacle and comprising two retaining blocks, wherein said two retaining blocks are arranged on a first surface of said circular cable-clamping plate such that an elongate gap is defined between said two retaining blocks for clamping said cable therein; and
    a circular sheltering plate for covering said circular cable-clamping plate, and comprising an external surface and an internal surface, wherein a rotary slice is perpendicular to said external surface, and a raised block is disposed on said internal surface,
    wherein said raised block is partially received in said gap when said circular cable-clamping plate is covered with said circular sheltering plate, and said circular cable-clamping plate is rotated relative to said case upon rotation of said rotary slice of said circular sheltering plate.

2. The cable management device according to claim 1 wherein said circular cable-clamping plate is an integral part.

3. The cable management device according to claim 1 wherein said circular cable-clamping plate further comprises a plurality of rollers, which are disposed on a second surface of said cable-clamping plate.

4. The cable management device according to claim 1 wherein a protrusion edge is extended from the periphery of said circular sheltering plate, a ring-shaped groove parallel with said circular base of said case is formed in an internal surface of said cylindrical sidewall, and said protrusion edge is received in said ring-shaped groove.

5. The cable management device according to claim 4 wherein said circular sheltering plate is an integral part.

* * * * *